Aug. 22, 1933.  A. W. SHARP  1,923,399
AUTOMATIC TAKE-UP FOR SHAFT BEARINGS
Filed March 24, 1930
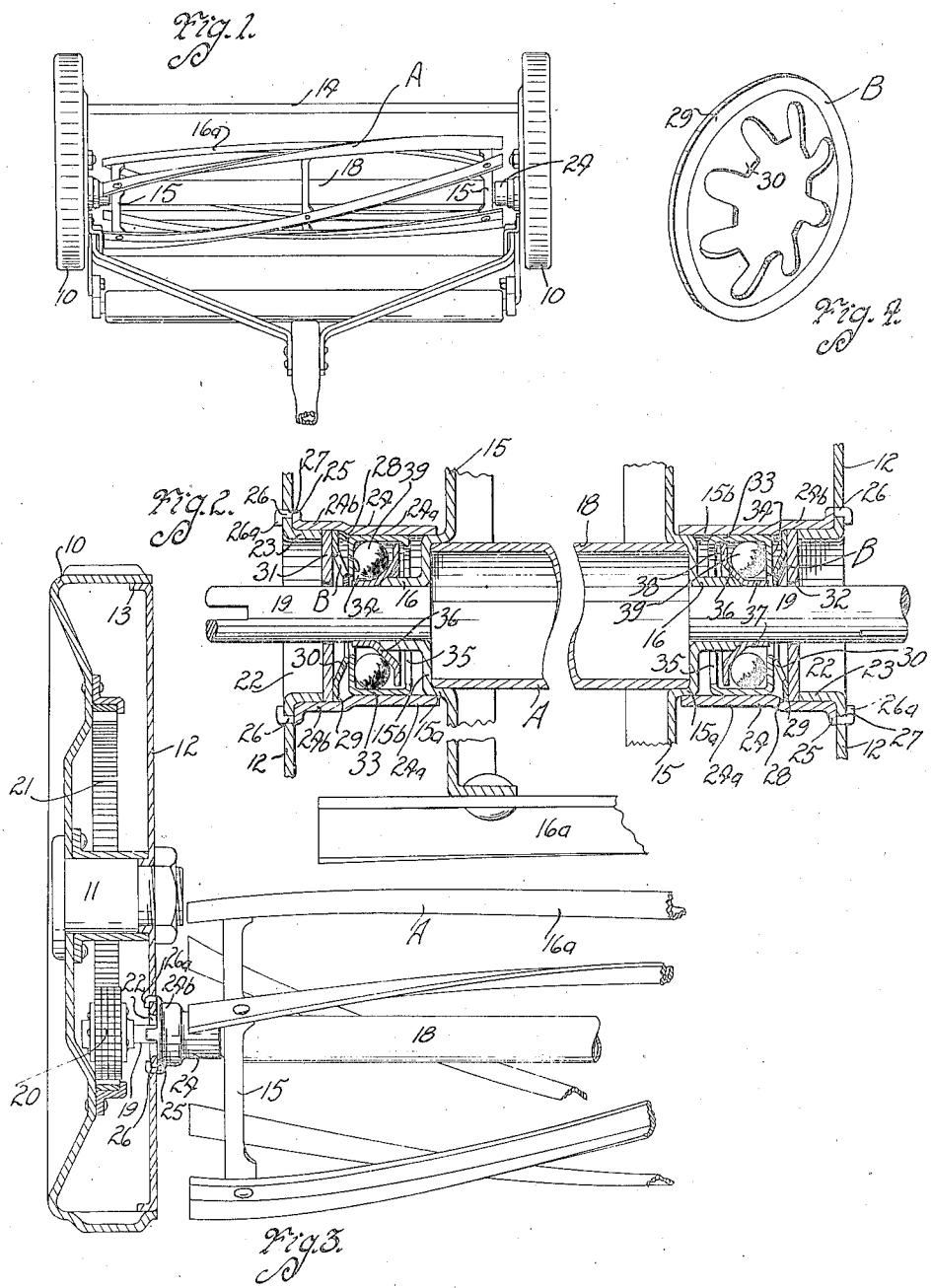
Inventor
Allen W. Sharp
by Bair, Freeman & Sinclair
Attorneys
Witness
Edw Seeley Patented Aug. 22, 1933

1,923,399

UNITED STATES PATENT OFFICE 1,923,399

AUTOMATIC TAKE-UP FOR SHAFT BEARINGS

Allen W. Sharp, Ottumwa, Iowa, assignor to Johnson Pressed Gear Co., Ottumwa, Iowa, a Corporation of Iowa Application March 24, 1930. Serial No. 438,490

6 Claims. (Cl. 308—189)

My invention has to do with an automatic take-up for shaft bearings.

More particularly, it is the purpose of my invention to provide a bearing structure for lawn mower reels of a unique construction including a spring device for keeping the bearings tight and taking them up and thus compensating for wear.

With these and other objects in view, my invention consists in the construction, arrangement and combination of the various parts of my automatic take-up for shaft bearings, whereby the objects contemplated are attained, as hereinafter more fully set forth, pointed out in my claims, and illustrated in the accompanying drawing, in which:

Figure 1 is a plan view of a lawn mower equipped with a bearing structure embodying my invention.

Figure 2 is a vertical, sectional view of the bearing structure.

Figure 3 is a vertical, sectional view through a lawn mower traction wheel illustrating the arrangement of the reel and bearing structure with relation to the wheel; and Figure 4 is a perspective view illustrating the spring comprising a part of the bearing take-up structure.

In the accompanying drawing, I have used the reference numeral 10 to indicate generally the traction wheels of a lawn mower. The wheels shown are of the pressed steel type arranged to rotate on spindles 11. Rigidly connected with the spindle 11 at each end of the mower is a stationary disc-shaped closure plate 12 having a peripheral flange 13 fitted within the rim of the wheel (Figure 2).

The opposite plates 12 are rigidly connected by a brace rod 14 (Figure 1) and by the cutter bar 14a. The reel used may be of the type shown in my co-pending application, Serial No. 428,096, filed February 13, 1930. The reel is indicated generally at A. The reel has the end spiders 15 carrying the blades 16a. These end spiders 15 have at their central portions laterally extending annular flanges 15a, from which flanges 15b extend inwardly and terminate in laterally extending tubular members 16.

The spider members 15 are connected by a tubular shaft member 18, the ends of which are received within the flanges 15a and abutting against the flanges 15b as best illustrated in Figure 2.

Shaft spindles 19 have their inner ends received in the tubular members 16, as shown in Figure 2, and are brazed or welded or otherwise rigidly secured thereto.

The outer ends of the shaft spindles 19 are operatively connected with the pinions 20 in some suitable way as for instance by the clutch structure shown in my co-pending application, Serial No. 428,097, filed February 13, 1930. The pinions 12 mesh with the internal gears 21 of the wheels 10.

The tubular shaft member A and the shaft spindle members 19 form the shaft of the reel.

I will now describe the bearings for this shaft. The disc closure plates 12 have in each instance off-center openings 22 at the edges of which are in-turned flanges 23. I provide a bearing casing 24 for each end of the reel shaft. The bearing casing 24 has the form of a tubular sleeve formed at its outer end with a peripheral outturned flange 25, from which spaced fingers 26 extend laterally. These fingers are inserted through holes 27 in the disc closure plate 12 and have their outer ends bent radially inwardly as at 26a (Figure 2) for thus rigidly mounting the bearing casing 24 on the disc closure plate 12.

The parts are so arranged that the casing 24 fits snugly on the outside of the flange 23 for giving greater strength and rigidity.

It will be noted that the inner portion of the bearing casing 24, as at 24a is of slightly smaller diameter than the outer portion thereof at 24b, thus providing at the junction between these two portions an internal annular shoulder 28. The parts are so arranged that the inner ends of the portions 24a of the bearing casings 24 loosely receive the flanges 15a on the spiders 15.

The casing 24 is installed on the disc closure plate 12.

I insert into the outer end of the casing 24 a spring ring B, such as is shown in Figure 4. The spring ring B comprises an outer flat ring member 29, which fits substantially against the shoulder 28 during the installation process, and the inwardly inclined spaced spring fingers 30.

Likewise before the installation of the casing 24 on the closure member 12, a metal washer 31 is inserted into the casing adjacent to the flat ring portion 29 of the spring ring B.

Then when the casing 24 is installed on the member 12, the washer 31 abuts against the inner end of the flange 23 of the member 12, as shown in Figure 2. The washer 31 has a hole 32 to receive the spindle member 19.

Before the spindle member 19 is inserted in position, I place on it a ball bearing structure, which may be a standard one.

The ball bearing structure comprises an outer race 33, having at one end the in-turned flange 34 of substantial width and at the other end a short in-turned flange 35.

The ball bearing structure also has the inner race 36 inclined as shown and having the annular horizontal flange 37 and the annular vertical flange 38 of well known structure.

The inner race 36 has some play lengthwise with relation to the outer race and between the flanges 34 and 35.

Between the races are the ordinary balls 39.

The parts are so arranged that when they are installed, the bearing race 36 abuts against the outer end of the tubular member 16.

There is thus provided a structure in which the ball bearings themselves may be standard, but the other parts are all capable of being made of pressed steel by die stamping methods. The parts are convenient and easy to fabricate and can be readily and easily assembled in the completed installation.

In the finished structure, the spring fingers 30 bear against the flanges 34 of the outer bearing race. Since the inner bearing race 36 engages the flange 16, it is obvious that there will always be a tendency on the part of the spring fingers to press the bearing races toward each other to take up any play that might exist.

It is not a difficult matter to disassemble the parts for replacing any that might become broken or so worn as to require replacement.

It will be seen that the present structure is inexpensive and does away with expensive threaded adjustments.

By using the spring structure, the adjustment can be secured in an inexpensive way originally at the factory and automatic adjustment is consequently maintained while the mower is in use.

The construction shown here gives a constant pressure equally distributed around the bearing through the multiple spring fingers which affords a better yielding adjustment that does the use of spiral or conical springs which affords pressure at one or two points only.

By the use of this flat multiple finger spring, I am able to secure greater tension by using all of the spring fingers and greater deflection in a small space than could be had by the use of any other type of spring.

Some changes might be made in the details of construction and arrangement of the parts without departure from the real invention involved.

I claim as my invention:

1. In a structure of the class described, a supporting element having an opening therein and formed with a flange around said opening, a bearing casing element for receiving said flange and secured to said support and having an annular shoulder on its interior spaced from said flange, a ring received between said flange and shoulder having inclined inwardly projecting spring fingers, a shaft structure including a spindle element, a member mounted on the spindle element comprising a tubular portion having an outwardly extending part terminating in an annular flange received in the end of said bearing casing, and an anti-friction bearing including anti-friction members and relatively movable race members, one of said race members being arranged in engagement with said spring fingers and the other in engagement with said tubular member.

2. In a structure of the class described, a support having an opening with an annular flange projecting therefrom, a bearing casing member snugly receiving said flange and mounted of said support and having an internal shoulder spaced from said flange, a ring in said casing adjacent to said shoulder having inwardly inclined spring fingers, a shaft structure having a spindle and a tubular portion thereon with an outwardly projecting annular member having at its outer portion an annular flange received within one end of said bearing casing, a ball bearing structure within said casing having anti-friction members and having relatively movable race members, one of them provided with walls at right angles to each other, and the other with an inclined intermediate wall and with walls inclined at right angles to each other, one of said race members being engaged by said spring fingers and the other by the tubular member on said spindle.

3. In a structure of the class described, a shaft, a ball race structure thereon including parts having relative adjustment, means for limiting the movement of the ball race relative to the shaft in one direction, and a ring having radially arranged fingers engaging the ball race adjacent said shaft and yieldingly pressing the ball race toward such limiting means.

4. In a structure of the class described, a supporting element having an opening therein and formed with a flange around said opening, a bearing casing element for receiving said flange and secured to said support, a shaft structure including a spindle element, a member mounted on the spindle element having an annular flange received in the end of said bearing casing and a bearing in said bearing casing.

5. In a structure of the class described, a supporting element having an opening therein and formed with a flange around said opening, a bearing casing element for receiving said flange and secured to said support and having an annular shoulder on its interior spaced from said flange, a washer received between said flange and said shoulder, a shaft structure including a spindle element, a member mounted on the spindle element having an outwardly extending part terminating in an annular flange received in the end of said bearing casing and a bearing in said bearing casing between said washer and said outwardly extending part, said bearing member being mounted on said spindle element.

6. In a structure of the class described, a supporting element having an opening therein and formed with a flange around said opening, a bearing casing element for receiving said flange and secured to said support, a shaft structure including a spindle element, a member mounted on the spindle element having an annular flange arranged in axially overlapping relation to said bearing casing and a bearing in said bearing casing.

ALLEN W. SHARP.